(12) United States Patent
Kreuzer

(10) Patent No.: US 7,591,480 B2
(45) Date of Patent: Sep. 22, 2009

(54) AIRBAG COVER FOR A VEHICLE OCCUPANT RESTRAINT SYSTEM

(75) Inventor: Martin Kreuzer, Kleinwallstadt (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 132 days.

(21) Appl. No.: 11/811,769

(22) Filed: Jun. 12, 2007

(65) Prior Publication Data

US 2007/0290487 A1    Dec. 20, 2007

(30) Foreign Application Priority Data

Jun. 16, 2006    (DE) .................. 20 2006 009 442 U

(51) Int. Cl.
B60R 21/16    (2006.01)
B60R 21/20    (2006.01)

(52) U.S. Cl. .................................... 280/728.3; 280/731

(58) Field of Classification Search ............. 280/728.3, 280/731
See application file for complete search history.

(56) References Cited

U.S. PATENT DOCUMENTS

| 2002/0000712 | A1* | 1/2002 | Derrick et al. ............ 280/728.3 |
| 2003/0042717 | A1* | 3/2003 | Hauer ........................ 280/731 |
| 2005/0062271 | A1 | 3/2005 | Heckl et al. |

FOREIGN PATENT DOCUMENTS

| DE | 19935625 | 2/2001 |
| DE | 10246338 | 5/2003 |
| DE | 102004010359 | 9/2005 |

* cited by examiner

*Primary Examiner*—Ruth Ilan
*Assistant Examiner*—Keith Frisby
(74) *Attorney, Agent, or Firm*—Tarolli, Sundheim, Covell & Tummino LLP

(57) ABSTRACT

An airbag cover for a vehicle occupant restraint system has an outside that is visible in the installed state and an opposite inside, a plastic cap and a reinforcement insert that, during one of foaming and injection-molding of the plastic cap, is partially embedded therein and partially adjoins the plastic on an inner side and on an outer side of the reinforcement insert. At least a section of the reinforcement insert protrudes outwards through the plastic cap to the visible outside.

13 Claims, 2 Drawing Sheets

AIRBAG COVER FOR A VEHICLE OCCUPANT RESTRAINT SYSTEM

TECHNICAL FIELD

The invention relates to an airbag cover for a vehicle occupant restraint system.

BACKGROUND OF THE INVENTION

Airbag covers are known which have a plastic cap and a reinforcement insert that, during foaming or injection-molding of the plastic cap, is partially embedded therein and partially adjoins the plastic on an inner side and on an outer side of the reinforcement insert. The reinforcement insert serves to stabilize the cover and, together with the plastic, bears an emblem or other decorative part.

The object of the invention is to create an airbag cover that is characterized by simple and hence inexpensive production.

BRIEF SUMMARY OF THE INVENTION

This is achieved in an airbag cover for a vehicle occupant restraint system having an outside that is visible in the installed state and an opposite inside, a plastic cap and a reinforcement insert that, during foaming or injection-molding of the plastic cap, is partially embedded therein and partially adjoins the plastic on an inner side and on an outer side of the reinforcement insert. At least a section of the reinforcement insert protrudes outwards through the plastic cap to the visible outside. The section or sections protruding to the outside serve as a decorative part that can optionally be accented in color by subsequent painting or coating. The advantages of the solution according to the invention lie in the simple production technique for the cover as well as in the secure anchoring in the plastic cap of the decorative part that is formed by the reinforcement insert.

According to a preferred embodiment, the section that protrudes outwards forms a decorative ring. After the injection-molding or foaming of the plastic cap, this ring can be painted or provided with a metallic design, for example, by means of a coating with hot-sealing films. In comparison to a decorative ring subsequently attached to the plastic cap, the design according to the invention is characterized by a better appearance, since the attachment sites are not visible on the outside. The decorative ring preferably extends around contiguously and does not have to be a circular ring.

Preferably, an emblem part is provided in a center of the cap, and the emblem part is positively joined to the reinforcement insert. Therefore, the reinforcement insert concurrently serves as an attachment possibility for the emblem part.

In particular, the emblem part lies directly on the reinforcement insert, which is to say that the plastic that covers the reinforcement insert can be dispensed with in the area of the emblem part, at least on the outside.

The reinforcement insert can be a large-surface, prefabricated part with cutouts through which the plastic cap extends. The cutouts serve to anchor the reinforcement insert inside the plastic cap that has been produced by means of foaming or injection-molding.

Advantageously, the material of the reinforcement insert has a greater hardness and/or tensile strength than the material of the plastic cap. As a result, the reinforcement insert constitutes a reinforcement that prevents the center area of the cover from buckling excessively when the airbag is deployed.

The cover preferably has a tear line and the reinforcement insert extends on both sides of the tear line. In the area of the tear line, the reinforcement insert is separated or at least weakened in order not to hinder the opening of the cover. In particular, the tear line can be provided with a starting point that is the first to tear open when the airbag is unfolded.

Preferably, the tear line extending outwards runs through the section of the reinforcement insert that protrudes outwards, thus ensuring a reliable unfolding of the airbag when it is deployed.

In particular, the cover has a central, essentially concave area. This otherwise unfavorable configuration, with which extreme excessive buckling of the central area can normally occur in case of deployment, resulting in over-stretching or even tearing of the segment areas that are formed during the opening, is not problematic with the airbag cover according to the invention, since the reinforcement insert prevents excessive buckling of the center areas. A visually attractive design is obtained when an emblem is arranged in the center of the concave area.

The concave area is preferably arranged inside the decorative ring and it is delimited by said ring.

According to a refinement of the invention, a section of the reinforcement insert that is located inside the decorative ring protrudes outwards to the outside. If the reinforcement insert material is appropriately dyed, then this section does not have to be separately coated. As a result, it is simple for the section that is located inside the decorative ring to be of a different color from that of the plastic cap without a demanding production process involving several masking steps for the coated areas in question.

As an alternative, it is, of course, also possible for only a bead of the reinforcement insert that forms the decorative ring to protrude outwards, while most of the reinforcement insert is embedded in the plastic cap.

DETAILED DESCRIPTION OF THE PREFERRED EMBODIMENTS

Figure 1:
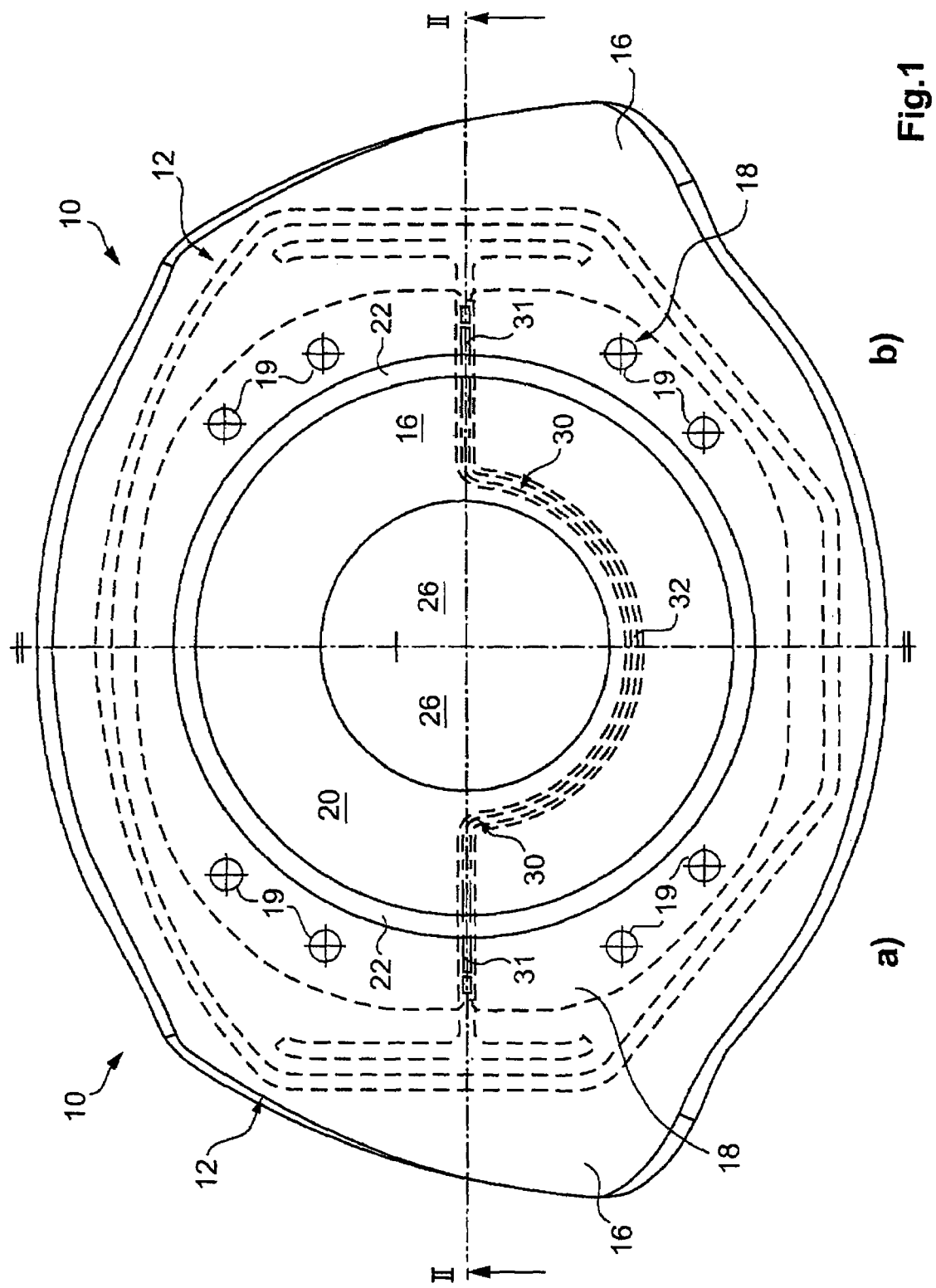
FIG. 1a shows a partial view of an airbag cover according to a first embodiment of the invention.
FIG. 1b shows a partial view of an airbag cover according to a second embodiment of the invention.
Figure 2:
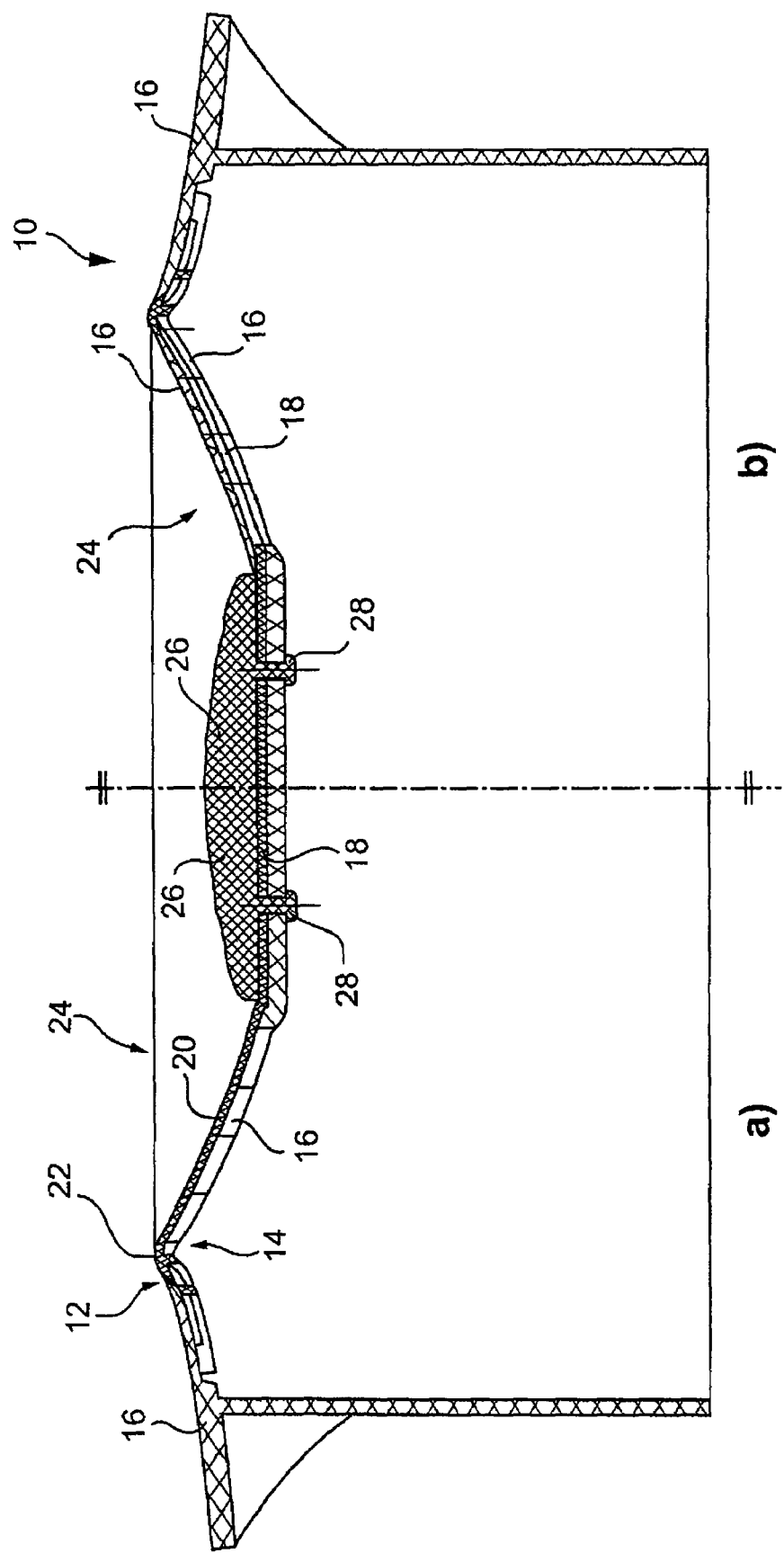
FIG. 2a shows a sectional view through the airbag cover arrangement from FIG. 1a along the line II-II.
FIG. 2b shows a sectional view through the airbag cover arrangement from FIG. 1b along the line II-II.

FIGS. 1a and 2a show an airbag cover 10 for a vehicle occupant restraint system that has an outside 12 that is visible in the installed state and an inside 14 opposite from the outside 12. The airbag cover has a plastic cap 16 as well as a reinforcement insert 18 made of a plastic that has a greater hardness and/or tensile strength than the material of the plastic cap 16. As can be seen in FIG. 1a, the reinforcement insert 18 is a large-surface, prefabricated part having several cutouts 19 through which the plastic cap 16 extends. The cutouts 19 serve to anchor the reinforcement insert 18 inside the plastic cap 16.

When the airbag cover 10 is produced, the reinforcement insert 18 is laid into a mold and encapsulated by foaming or injection molding with the material that forms the plastic cap 16. The plastic cap 16 is made of a conventional material such as TPE, TEEE or TPO, whereas the reinforcement insert 18 is made, for example, of TPEE, PC or PC/ABS. In the finished cover 10, the reinforcement insert 18 is at least partially embedded in the plastic cap 16 and the reinforcement insert 18 at least partially adjoins the plastic of the cap on an outer side and on an inner side of the reinforcement insert 18.

As can be seen especially in FIG. 2a, a central section 20 of the reinforcement insert 18 protrudes outwards through the plastic cap 16 to the outside 12, and an outer, bead-like part of the section 20 forms a decorative ring 22 that is provided with a metallic design by means of hot-sealing films after the foaming or injection molding of the plastic cap 16.

A central area 24 of the cover 10 inside the decorative ring 22 is essentially concave in shape. An emblem part 26 is provided in the center of the concave area 24 (and thus in the center of the cap), and this emblem part 26 lies directly on the reinforcement insert and is positively joined to the latter via several integrally formed bolts 28. The section 20 of the reinforcement insert 18, which is located inside the decorative ring 22 and thus in the central concave area 24 and which is visible from the outside, has a different color from that of the plastic cap 16, which is particularly easy to achieve by an appropriate coloration of the reinforcement insert material. As a result, the central area 24 does not have to be subsequently coated.

Furthermore, the cover 10 has a tear line 30 (see FIG. 1a) that runs in the center area of the cover 10 around the emblem part 26 and that has two sections 31 extending laterally outwards, which run through the section 20 of the reinforcement insert 18 that protrudes outwards or through the decorative ring 22. In the area of the emblem part 26, the tear line 30 is provided with a starting point 32 that is about 0.3 to 0.6 mm thick and that is the first to tear open when the airbag is unfolded. The reinforcement insert 18 extends on both sides of the tear line 30 so that, in case of deployment, its greater hardness and/or tensile strength prevents excessive buckling of the concave center area 24 that is divided into several segments along the tear line 30.

FIGS. 1b and 2b show an airbag cover 10 according to a second embodiment, in which the same or functionally equivalent components have the same reference numerals and below, only the differences from the already described embodiment will be discussed. With the airbag cover 10 according to FIGS. 1b and 2b, the reinforcement insert 18 is embedded in the plastic cap 16 also in the central concave area 24 (except for the section underneath the emblem part 26), that is to say, it does not protrude to the outside. Only the bead-like section of the reinforcement insert 18 that forms the decorative ring 22 can be seen on the outside 12. This embodiment is especially well-suited for single-color airbag covers.

The invention claimed is:

1. An airbag cover for a vehicle occupant restraint system comprising
   an outside (12) that is visible in the installed state and an opposite inside (14), a plastic cap (16) and
   a reinforcement insert (18) that, during one of foaming and injection-molding of the plastic cap (16), is partially embedded therein and partially adjoins the plastic on an inner side and on an outer side of the reinforcement insert (18),
   at least a section of the reinforcement insert (18) protruding outwards through the plastic cap (16) to the visible outside (12),
   an emblem part (26) positively joined to the reinforcement insert (18), said emblem part (26) being a separate piece from said reinforcement insert (18).

2. The airbag cover according to claim 1, wherein the section that protrudes outwards forms a decorative ring (22).

3. The airbag cover according to claim 2, wherein a section (20) of the reinforcement insert (18) that is located inside the decorative ring (22) protrudes outwards to the outside (12).

4. The airbag cover according to claim 1, wherein the emblem part (26) lies directly on the reinforcement insert (18).

5. The airbag cover according to claim 1, wherein a material of the reinforcement insert (18) has at least one of a greater hardness and tensile strength than a material of the plastic cap (16).

6. The airbag cover according to claim 1, wherein the cover (10) has a tear line (30) and the reinforcement insert (18) extends on both sides of the tear line (30).

7. The airbag cover according to claim 6, wherein the tear line (30) extending outwards runs through the section (20) of the reinforcement insert (18) that protrudes outwards.

8. The airbag cover according to claim 1, wherein the cover (10) has a central, essentially concave area (24).

9. The airbag cover according to claim 8, wherein the concave area (24) is arranged inside the decorative ring (22).

10. The airbag cover according to claim 1, wherein a section of the reinforcement insert (18) between the section that protrudes outwards and a section that is in direct contact with the emblem part (26) is embedded in the cap (16).

11. An airbag cover for a vehicle occupant restraint system comprising
    an outside (12) that is visible in the installed state and an opposite inside (14),
    a plastic cap (16) and
    a reinforcement insert (18) that, during one of foaming and injection-molding of the plastic cap (16), is partially embedded therein and partially adjoins the plastic on an inner side and on an outer side of the reinforcement insert (18),
    at least a section of the reinforcement insert (18) protruding outwards through the plastic cap (16) to the visible outside (12), the reinforcement insert (18) being a large-surface, prefabricated part with cutouts (19) through which the plastic cap (16) extends.

12. An airbag cover for a vehicle occupant restraint system comprising:
    an outside (12) that is visible in the installed state and an opposite inside (14),
    a plastic cap (16) and
    a reinforcement insert (18) consisting of a plastic material that, during one of foaming and injection-molding of the plastic cap (16), is partially embedded therein and partially adjoins the plastic on an inner side and on an outer side of the reinforcement insert (18),
    a first section of the reinforcement insert (18) protruding outwards through the plastic cap (16) to the visible outside (12) and forming a decorative ring (22) and
    a second section (20) of the reinforcement insert (1 8) that is located inside the decorative ring (22) protruding outwards to the outside and defining a visible surface.

13. The airbag cover according to claim 12, wherein an emblem part (26) is provided in the center of the cap (16) and a ring-shaped section of the reinforcement insert (18) between the emblem part (26) and the decorative ring (22) protrudes to the outside and defines a visible surface.

* * * * *